United States Patent [19]

Mulcahy et al.

[11] Patent Number: 5,340,495
[45] Date of Patent: Aug. 23, 1994

[54] COMPOSITIONS FOR CLEANING INK FROM A PRINTING PRESS AND METHODS THEREOF

[75] Inventors: James P. Mulcahy, Willow Springs, Ill.; Raymond P. Jadrich, Twin Lakes, Wis.

[73] Assignee: Siebert, Inc., Lyons, Ill.

[21] Appl. No.: 55,816

[22] Filed: Apr. 30, 1993

[51] Int. Cl.$^5$ ............................................. C09D 9/00
[52] U.S. Cl. ................................. 252/162; 106/243; 106/311; 134/38
[58] Field of Search ............... 106/311, 20 A, 243; 252/162; 134/38

[56] References Cited

U.S. PATENT DOCUMENTS

| | | | |
|---|---|---|---|
| 4,145,226 | 3/1979 | Neuhaus | 106/311 |
| 4,295,845 | 10/1981 | Sepulveda et al. | 252/162 |
| 4,363,756 | 12/1982 | Sepulveda et al. | 252/550 |
| 4,504,406 | 3/1985 | Dhillon | 252/162 |
| 4,707,293 | 11/1987 | Ferro | 252/174.17 |
| 4,877,556 | 10/1989 | Wilsberg et al. | 252/544 |
| 4,909,962 | 3/1990 | Clark | 252/547 |
| 5,104,567 | 4/1992 | Staehr | 252/174.17 |
| 5,156,760 | 10/1992 | Marchese et al. | 252/162 |
| 5,194,173 | 3/1993 | Folkard et al. | 252/162 |

FOREIGN PATENT DOCUMENTS

| | | | |
|---|---|---|---|
| 0111136 | 6/1984 | European Pat. Off. | 106/311 |
| 0307024 | 3/1989 | European Pat. Off. | |
| 2526404 | 12/1976 | Fed. Rep. of Germany | 252/162 |
| 2810989 | 9/1979 | Fed. Rep. of Germany | 252/162 |
| 1457335 | 12/1976 | United Kingdom | 252/162 |
| 90/04674 | 5/1990 | World Int. Prop. O. | 252/162 |

*Primary Examiner*—Anthony Green
*Attorney, Agent, or Firm*—Fitch, Even, Tabin & Flannery

[57] ABSTRACT

Improved cleaner compositions and methods useful for removing ink from parts of a printing press are provided. The cleaner compositions comprise a fatty acid methyl ester and a nonionic surfactant which is an ethoxylated $C_4$–$C_{10}$ alcohol. The cleaner compositions may further comprise a mixed heteric oxide of a higher chain alcohol, and water. The cleaner compositions, which are devoid of volatile organic compounds, eliminate the need to dry the parts of a printing press, particularly the rubber blanket, which need periodic cleanings during a run. The non-volatile cleaner compositions are combinable with printing ink compositions without appreciably affecting the printing characteristics of the ink. When printing is resumed while the rubber blanket is wetted with the cleaner, the cleaner becomes blended with the formed image as the image is received by the rubber blanket and the blended mixture is then printed. Printing resolution and color matching rise to meet commercial requirements within a few prints. Cleaner compositions comprising a fatty acid methyl ester and at least one volatile organic compound are also provided. In applications where the use of volatile organic compounds is desirable, the compositions of the invention allow the percentage of volatile organic compounds to be reduced while retaining good cleaning characteristics. Cleaner compositions for removing UV ink are also provided. The UV ink cleaner compositions comprise a fatty acid methyl ester and a heteric alkylene oxide of lower chain alcohol.

24 Claims, No Drawings

COMPOSITIONS FOR CLEANING INK FROM A PRINTING PRESS AND METHODS THEREOF

FIELD OF THE INVENTION

The present invention is directed to cleaning compositions for removing printing ink from parts of a printing press, which compositions are devoid of, or have reduced amounts of, volatile organic compounds (VOC's), and more specifically, to cleaning compositions which are compatible with the printing ink so that, after cleaning, printing may be resumed while the cleaned parts are still wetted with the cleaning composition.

BACKGROUND OF THE INVENTION

Lithographic printing techniques including offset lithography employ an image plate which is treated in such a way as to have hydrophilic areas which are receptive to water, but not ink, and hydrophobic areas which are receptive to ink, but exclude water. The image plate is contacted with a dampening system that applies an aqueous fountain solution to the hydrophilic portions of the plate and is contacted with an ink fountain which applies ink to the hydrophobic portions of the plate. The image plate then comes into contact with, and transfers the image to, a rubber blanket which in turn is brought into contact with a paper substrate, where the image is laid down to produce a printed sheet. The printing cycle is repeated continuously and at high speed.

As is well recognized in the art, print quality commonly deteriorates (e.g., blurring occurs at the edges of the printed and non-printed areas), with increased numbers of prints made since the last cleaning. This may be caused by accumulation of lint, dust, small pieces of paper, and the like on image plate or rubber blanket during the printing process. When this occurs, the press must be stopped to clean ink from the rubber blanket and/or other ink bearing parts of the press such as the rollers, ink train or the image plate. Most commonly, the rubber blanket becomes fouled and must be cleaned. This may be accomplished manually by rotating the printing press to locate the top of the rubber blanket and then removing all ink and foreign substances from the blanket, one section at a time, with a lint-free cloth saturated with a cleaning composition. After the rubber blanket is clean and dry, printing may be resumed. Thus, for an efficient printing operation it is important to be able to quickly and efficiently remove the ink and resume printing on the cleaned surfaces.

Until recently, the preferred cleaning fluids were solvents which are volatile organic compounds, such as mineral spirits, trichloroethylene, toluene, xylenes or the like. Using volatile organic compounds and manually rotating the printing press and cleaning off the blanket section-by-section, by the time the bottom of the blanket is cleaned, the volatile cleaner will have evaporated to dryness from the previously cleaned sections. In view of environmental concerns and ever-tightening EPA restrictions concerning the use of volatile organic compounds, there is a desire to find compositions which can be used to remove ink from the rubber blanket and other members of a printing press without undue amounts of machine downtime. U.S. Pat. No. 5,104,567 discloses a conventional cleaning composition which comprises 90-99% soy oil and 1-10% emulsifier. While such compositions are devoid of volatile organic compounds, they are significantly less effective than such volatile compounds for ink removal. With respect to such conventional cleaning compositions comprising soybean oil and emulsifier, it is common to have to clean the rubber blanket with more than one application of cleaner. Typically, this involves vigorously scrubbing the rubber blanket with cleaner; rinsing it with water, and then re-applying the cleaner one or more times to get the blanket sufficiently clean. Additionally, the pressman must completely remove the cleaner from the rubber blanket (i.e., wipe the blanket dry) prior to resuming the printing operation. If the conventional cleaning compositions comprising soy oil and emulsifiers are not completely removed, they will contaminate, break-down and reduce the tack of the ink on the ink-bearing components of the press including the image plate and blanket. If that occurs, the cleaning procedure will have to be repeated, and the components dried, before printing can resume.

Lithographic printing presses with automatic blanket washers are also known. Automatic blanket washers have a sprayer means for spraying a cleaner composition onto the rubber blanket and a removing means for removing the cleaner/ink mixture. Typically, an automatic blanket washer sprays a metered amount of cleaner onto the blanket while the press is at idle speed with the blanket disengaged from the image plate. In one well known apparatus the ink/cleaner removing means comprises an inflatable bladder having affixed thereto a woven cloth material (e.g., woven polyester). The bladder is inflated to bring the cloth material into contact with the rotating blanket, whereby the ink/cleaner mixture is rubbed off. Conventional cleaner compositions devoid of volatile organic compounds are not suitable for use in automatic blanket washers. Prior to the present invention, volatile organic compounds were required so evaporation would dry the blanket prior to the resumption of printing.

Thus, it would be very desirable to provide ink cleaning compositions which are devoid of, or have reduced amounts of, volatile organic compounds, and which are effective for removing ink from the parts of a printing press. It would also be very desirable to provide cleaning compositions which have low or no volatile organic compounds and are compatible with ink compositions so that the cleaning compositions do not have to be dried from the parts of the press, especially the rubber blanket, before printing is resumed.

SUMMARY OF THE INVENTION

The present invention is based on the discovery that a composition comprising a fatty acid methyl ester and a nonionic surfactant which is an ethoxylated $C_4$–$C_{10}$ alcohol having 2 to 10 moles of ethylene oxide per mole of alcohol is very effective for solubilizing and removing ink from the parts of a printing press, and, surprisingly, when combined with ink compositions at dilutions of up to at least about 2:1 (ink:cleaner composition), does not adversely affect physical properties of ink compositions (e.g., "tack") which are necessary for the proper transfer of ink for printing. The compositions of the invention optionally may comprise a second nonionic surfactant which is a heteric alkylene oxide condensation product of a $C_{12}$–$C_{18}$ alcohol and, also optionally, a minor amount of water.

The cleaning compositions of the invention advantageously do not have to be dried from porous or nonporous parts of a printing press before resuming operation of the press. Compositions of the present invention are capable of blending with ink compositions. This allows printing to be resumed while the image transferring components of the press are still wetted with the cleaning compositions of the invention so that, in the normal course of printing, the cleaning compositions become blended with, and transferred down-stream with, the print image. The ink/cleaner mixture is ultimately printed onto the paper substrate. With each successive cycle of the press, diminished amounts of cleaning composition remain on the cleaned parts of the press. Within a few prints, substantially all the cleaning composition has been diluted out by the ink and fountain solution and removed from the cleaned parts of the printing press and absorbed onto the printed substrate. Thus, in another of its aspects, the invention entails methods for cleaning ink from the parts of a printing press, especially the rubber blanket, which methods allow printing to be resumed without the need to dry the cleaned parts.

The compositions of the invention are combinable with ink compositions (without separation of the ink pigment from carrier) at dilutions which are encountered during ink removal. The compositions of the invention are also water rinsable. Advantageously, the compositions of the invention may be applied to ink laden parts of a printing apparatus (e.g., the roller train) and the resulting ink/cleaner mixture easily water-rinsed from the apparatus.

In another of its aspects, the present invention relates to a liquid ink cleaner composition for removing ink from parts of a printing press, said composition comprising:
   60%–95% by weight of a methyl ester of a $C_8$–$C_{22}$ fatty acid; and
   5%–40% by weight of a nonionic surfactant which is an ethoxylated $C_4$–$C_{10}$ alcohol having a molar ratio of ethylene oxide to alcohol of between about 2:1 to about 8:1;
   wherein the ink cleaner is miscible with a printing ink composition at dilutions up to at least 2:1 by volume (ink:cleaner) without significantly reducing the tack of the ink. One preferred liquid ink clean composition contains about 85% soybean oil methyl ester and about 15% ethoxylated hexanol.

In another of its aspects, the present invention relates to a liquid ink cleaner composition for removing ink from parts of a printing press, said composition comprising:
   40%–90% by weight of a methyl ester of a fatty acid; and
   5%–30% by weight of a first nonionic surfactant which is an ethoxylated $C_4$–$C_{10}$ alcohol having a molar ratio of ethylene oxide to alcohol of between about 2:1 to about 8:1;
   5%–30% by weight of a second nonionic surfactant which is a heteric alkylene oxide (ethoxy:propoxy) condensation product of $C_{12}$–$C_{18}$ alcohol; and
   0–20% water;
   wherein the ink cleaner is miscible with a printing ink composition at dilutions up to at least 2:1 by volume (ink:cleaner) without significantly reducing the tack of the ink. One preferred ink cleaner composition contains about 50%–60% soybean oil methyl ester, about 20%–25% of said ethoxylated hexanol, and about 20%–25% of said heteric alkylene oxide of a $C_{12}$–$C_{18}$ alcohol. Water, if present, is preferable at about 5%–10% be weight.

In another of its aspects, the present invention relates to an ink cleaner composition comprising about 50% soybean oil methyl ester, about 20% of said ethoxylated hexanol, and about 20% of said heteric alkylene oxide of a $C_{12}$–$C_{18}$ alcohol and about 10% water.

In another of its aspects, the present invention relates to a liquid ink cleaner composition for removing from parts of a printing press, inks which are photoreactively cured by exposure to ultraviolet radiation, said composition comprising:
   50%–95% by weight of a methyl ester of a $C_8$–$C_{22}$ fatty acid; and
   5%–50% by weight of a heteric alkylene oxide condensation product of a $C_1$–$C_4$ alcohol having about 70% to about 98% alkylene oxide by weight, wherein said alkylene oxide portion comprises ethylene oxide and propylene oxide in a ratio of from about 1:2 to about 1:1 (ethylene oxide:propylene oxide).

In another of its aspects, the present invention is based on the discovery that a composition comprising 50–95% (by volume) of a fatty acid methyl ester and 5–50% (by volume) of a solvent which is a volatile organic compound provides a cleaning composition which is effective for removing ink from the parts of a printing press. It has been found that the fatty acid methyl esters are excellent diluents which allow lower percentages of volatile organic compounds to be used for ink removing compositions, yet the cleaning composition are miscible to soluble with ink compositions. The volatile organic compounds evaporate from the cleaned parts of a printing press leaving a film of the fatty acid methyl ester which can be combined with the printing ink without adversely affecting the physical properties of the ink necessary for proper transfer of ink for printing.

In another aspect, the invention entails ink cleaner compositions for removing UV inks (i.e., inks which are dried by exposure to ultraviolet light) said compositions comprising a fatty acid methyl ester and a nonionic surfactant which is a heteric alkylene oxide condensation product of a $C_1$–$C_4$ alcohol and optionally may include a nonionic surfactant which is a heteric alkylene oxide condensation product of a $C_{12}$–$C_{18}$ alcohol and, also optionally, may include a minor amount of water.

DETAILED DESCRIPTION OF THE INVENTION

In one of its aspects, the present invention is directed to ink cleaner compositions comprising a methyl ester of a fatty acid and a nonionic surfactant which is an ethoxylated $C_4$–$C_{10}$ alcohol having between 2 and 8 moles of ethylene oxide per mole of alcohol, wherein the ink cleaner is miscible with an ink composition at low to moderate dilutions without adversely affecting the tack of the ink and is miscible with the ink composition at higher dilutions without separation of ink pigment from ink carrier.

In another of its aspects, the invention is directed to ink cleaner compositions comprising a methyl ester of a fatty acid and a first nonionic surfactant which is an ethoxylated $C_4$–$C_{10}$ alcohol having between 2 and 8 moles of ethylene oxide per mole of alcohol, a second nonionic surfactant which is an heteric alkylene oxide condensation product of a $C_{12}$–$C_{18}$ alcohol and, optionally, water, wherein the ink cleaner is miscible with an ink composition at low to moderate dilutions without adversely affecting the tack of the ink and is miscible with the ink composition at higher dilutions without separation of ink pigment from ink carrier.

In another of its aspects, the present invention is an ink cleaner composition comprising a methyl ester of a fatty acid and an amount of at least one volatile organic compound which is soluble in the methyl ester and which is effective for cleaning ink from parts of a printing press. Advantageously, such compositions may further comprise a nonionic surfactant alcohol such as an ethoxylated $C_4-C_{10}$ alcohol.

In another of its aspects, the present invention is directed to a method for cleaning an image transferring surface of a printing press, the image transferring surface having an image comprising ink and aqueous fountain solution, which image is transferred in the process of printing to a printing substrate, the method comprising:

(a) contacting the image comprising ink and aqueous fountain solution with a sufficient quantity of an ink cleaner composition for a sufficient amount of time, to substantially clean the ink image from the transferring surface, said ink cleaner composition being combinable with the ink and fountain solution without substantially affecting the transferability of the ink image; and (b) while the image transferring surface is wetted with the cleaner composition, operating the printing press to transfer a series of images comprising ink and aqueous fountain solution to produce a plurality of printed sheets whereby the cleaning composition is blended into the ink and aqueous fountain solution and removed from the image transferring surface to a plurality of sheets of paper to yield printed sheets having decreasing amounts of cleaning composition and increasing resolution until a plurality of prints of commercially acceptable quality are produced. Within a few printing cycles (e.g., less than about 10-20 prints), a series of prints are obtained which meet commercial standards for image sharpness, color matching, and like qualities.

The present invention is based in part on the unexpected discovery that cleaning compositions which are devoid of volatile organic compounds and which comprise as a diluent a fatty acid methyl ester can be combined with ink compositions at dilutions of up to at least 1 volume cleaner:2 volumes ink, without decreasing the tack of the ink, but when combined with ink compositions at higher concentrations, the cleaner compositions significantly reduce adherence of the ink to the parts of a printing press. This unexpected combination of traits provides ink cleaning compositions which do not need to be dried from parts of a printing press, especially the rubber blanket, prior to printing. It has also surprisingly been found that the compositions of the invention are capable of solubilizing ink and maintaining the solubility of ink at high dilutions without causing the ink pigment to separate. Thus, where it is desired to clean a part to dryness, the cleaning compositions of the invention will not cause significant precipitation of ink pigment onto the cleaned parts.

Preferred fatty acid methyl esters comprising the compositions of the invention include the methyl esters of saturated and unsaturated vegetable oils having from 8 to 22 carbon atoms and having a titer (transition point from crystallized to liquid) which is between about $-20°$ C. and about $25°$ C. The methyl esters of oils, including but not limited to soybean, canola, corn, peanut, sunflower seed, coconut, palm, palm kernel and safflower oil, and other plant derived oils are suitable for use in the present invention. The methyl esters of oils or fats derived from animal or fish sources or of mineral oils such as paraffin oil may also be used. Soybean oil methyl ester and canola oil methyl ester are presently preferred.

The methyl esters of many oils are commercially available. And, the transesterification of oils to produce a methyl ester of the oil is well known in the art. For example, the methyl ester of soybean oil may be made by reacting a mixture consisting of 85% soybean oil, 14% methanol and 1% sodium methylate at a temperature of 120° C. to 200° C., preferably about 165° C., for a sufficient amount of time to produce the esterified oil.

A first nonionic surfactant of the compositions of the present invention is an ethoxylated alcohol of the formula $R_1O-(CH_2CH_2O-)_nH$, wherein $R_1$ is a $C_4-C_{10}$ straight or branched carbon chain and n is between about 2 and 8 (i.e., the molar ratio of ethylene oxide to alcohol is between about 2:1 and about 8:1). A first surfactant should have an HLB of 9-15. The first surfactant is more preferably a compound wherein $R_1$ group is n-pentyl, n-hexyl, or n-heptyl, and n is between about 3 and 6. Synthesis of such alkoxylated alcohols by reacting, in the presence of an alkali metal hydroxide (e.g., NaOH), an alcohol and alkylene oxide at a predetermined molar ratio is well known. A presently preferred first surfactant is an ethoxylated hexanol which is made using between 4 and 5 moles of ethylene oxide per mole of hexanol.

The first surfactant which is an ethoxylated $C_4-C_{10}$ alcohol has been found to provide a fine balance of excellent oil solubility, pigment wettability and ink thinning properties in combination with excellent water solubility. Compositions of the invention comprising a first surfactant and a fatty acid methyl ester surprisingly are compatible with ink compositions at dilutions up to at least 2 parts ink to 1 part cleaner composition (by volume) without adversely affecting physical properties of the ink which are necessary for printing, especially the "tack" of the ink and are also highly miscible with the aqueous fountain solution. The dilutions of up to at least 1:2 (cleaner:ink), as referred to herein, are characteristic of the dilutions effected when printing is resumed on parts of a printing press which are cleaned, but still wetted with the compositions of the invention. The phrase "tack of the ink" is understood by those skilled in the art as referring to the capacity of the ink to be picked up and transferred via the image bearing surfaces of the press to the printed substrate. Because the tack of the ink is not adversely affected, the sharpness of the image (i.e., resolution) recovers rapidly after resumption of printing.

Excellent pigment wettability is a further feature of the compositions of the invention comprising a fatty acid methyl ester and a nonionic surfactant which is an ethoxylate of a $C_4-C_{10}$ alcohol. This feature allows the ink-bearing parts of a printing press to be cleaned and, optionally, water-rinsed without separating or precipitating the ink pigment back onto the parts.

The cleaning compositions of the present invention may further comprise a second surfactant which is a heteric alkylene oxide condensation product (preferably, ethylene oxide and propylene oxide) of a $C_{12}-C_{18}$ linear or branched chain alcohol, wherein the surfactant has, based on the weight of the composition, 40% to 85% alkylene oxide, and wherein the mole ratio of ethylene oxide to propylene oxide varies from about 3:1 to about 1.5:1 near the hydrocarbon portion of the molecule and about 1:3 to about 1:1.5 at the hydrophilic end of the molecule. Such surfactants may also be referred to as "mixed oxide" condensation products. Suitable second surfactants which may be used in the cleaning compositions of the invention are those described in U.S. Pat. Nos. 3,340,309 and 3,770,701, the contents of which are hereby incorporated by reference into the present specification. Suitable commercially available surfactants which are mixed oxide condensation products include Plurafac D25, Plurafac B-25-5, and Plurafac RA-30 (BASF Corporation, Parsippany, N.J.); Macol 25, Macol 30, Macol LF-110, and Mazawet DF (PPG Chemicals Group, Gurnee, Ill.); Triton DF-20 and Triton CF-76 (Union Carbide Chemicals and Plastics Co., Danbury, Conn.); Alkasurf LA-EP15, Alkasurf LA-EP35, Alkasurf LA-EP38, Alkasurf LA-EP59, Alkasurf LA-EP65 (Alkaril Chemicals LTD., Mississauga, Ontario), and like heteric alkylene oxide condensation products of $C_{12}$ to $C_{18}$ alcohols. A second surfactant should have a cloud point of 15° C.–65° C., more preferably between 30° C. and 50° C. The cloud point is defined as the temperature at which a 1% (by weight) aqueous solution of the surfactant changes from clear to cloudy when heated. A presently preferred second surfactant is a heteric alkylene oxide condensation product of a lauryl alcohol preparation (e.g., Neodol-25 or Epol 12-18) which is prepared under reaction conditions where the ratio of alkylene oxides varies during the reaction from 70% ethylene oxide/30% propylene oxide (initial mixture) to a final mixture of 30% ethylene oxide/70% propylene oxide. A suitable second surfactant imparts to the compositions of the invention excellent detergent properties and deep cleaning capacity for penetrating into and solubilizing ink present in the rubber blanket and especially the rubber rollers of a printing press.

The ratio of first surfactant to second surfactant may preferably be from about 0.5:1 to about 5:1. As is known in the art, conventional ink compositions comprise pigments, a carrier such as mineral oil, soybean oil or the like, and emulsifiers. The ratio of first surfactant to second surfactant will vary according to the emulsifier level, carrier, and pigment loading in the ink and the residue pigment in the rollers and on the blanket. In inks which contain high levels of emulsifier and high levels of pigments, a relatively higher ratio of the first surfactant (ethoxylated $C_4$–$C_{10}$ alcohol) is desired to maintain pigment wettability and to help reduce the viscosity of the ink without pigment separation. In inks which contain low levels of emulsifiers and pigment, a relatively higher ratio of the second surfactant (mixed oxide condensation product) is desired to maintain detergency and water rinsability without pigment separation. On rollers and blankets which have accumulated pigments from previous solvent based cleanups, a high ratio of both surfactants is desirable to wet the pigments and intensify the detergency and increase the water rinsability of the deposited pigments.

The compositions of the present invention advantageously may comprise a minor amount (0.5%–20% by weight) of water, which has been unexpectedly found to increase the wetting ability of the surfactants and greatly enhance the removal of paper dust and lint from rollers and blankets. While it is preferred to include water in the compositions, a cleaning composition of the invention comprising a first surfactant which is an ethoxylated $C_4$–$C_{10}$ alcohol, optionally, a second surfactant which is a heteric alkylene oxide of a $C_{12}$–$C_{18}$ alcohol and a diluent which is a methyl ester of a fatty acid (but which is devoid of water) is water-rinsable. The feature of water rinsability in combination with the feature of high miscibility with ink compositions without substantial precipitation of pigment allows the cleaning composition to be sprayed or squirted onto the parts of a printing press (e.g., the roller train) while it is at idle speed and rinsed off with a stream of water. This allows for a significant time savings over stopping the apparatus and cleaning and drying the parts manually.

In another of its aspects, the present invention is directed to ink-removing cleaning composition for removing UV inks from parts of a printing press. UV inks have low levels of volatile organic compounds and are characterized in that they are photoreactively cured or dried by exposure to ultraviolet radiation. Such UV inks are well known in the art and commercially available (e.g., Sun Chemicals, Inc., Fort Lee, N.J.). The cleaner compositions of the invention which are useful for cleaning UV inks from parts of a printing press comprise 50%–95% (by weight) of a fatty acid methyl ester and 5–50% (by weight) of a heteric alkylene oxide condensation product of a $C_1$–$C_4$ alcohol. The heteric oxide of a $C_1$–$C_4$ alcohol has, based on the weight of the composition, about 80% to about 97% alkylene oxide. The ratio of alkylene oxides is preferably from about 1:2 to about 1:1 (ethylene oxide:propylene oxide). A mixed heteric oxide of methanol having a mole ratio of 3.5 moles ethylene oxide:5.5 moles propylene oxide per mole of methanol is presently preferred.

The preferred mixed heteric oxide of methanol may be made by reacting propylene glycol monomethyl ether, ethylene oxide and propylene oxide (1:3.5:4.5 on a molar basis) in the presence of sodium methoxide (0.1% by weight) as base. The reaction may be carried out at a temperature between about 100° C. and 150° C. or higher, preferably at about 135° C., for 4–8 hours at a maximum pressure of 90 psi. The heteric oxides of other lower chain alcohols may be prepared analogously.

An especially preferred for cleaner composition for removing UV inks from a rubber blanket is a composition comprising 85% of the methyl ester of soybean oil and 15% of a mixed heteric (ethylene oxide/propylene oxide) oxide of methanol.

It is desirable to rinse the rubber blanket with water after cleaning with such cleaner compositions as the compositions are relatively hydrophilic. Furthermore, as with the compositions of the invention for removing conventional inks, preferred compositions for cleaning UV ink from the rollers of a press may include about 5% to about 30% by weight of a mixed heteric alkylene oxide condensation product of a $C_{12}$–$C_{18}$ alcohol (e.g., Plurafac D-25) and between about 0% and about 20% water.

In another of its aspects, the present invention is directed to ink-removing cleaning composition which comprise a 50%–95% (by volume) fatty acid methyl ester and 5%–50% (by volume) of a volatile organic compound. In this aspect of the invention it has been found that a fatty acid methyl ester is an excellent diluent which allows significant reduction in the concentration of an organic solvent needed to remove ink compositions. In this embodiment the compositions may further comprise a suitable amount of a nonionic surfactant, preferably an ethoxylated $C_4$ to $C_{10}$ alcohol as defined herein.

Volatile organic compounds are known to be capable of solubilizing printing ink compositions. Volatile organic compounds useful in accordance with the present invention should be dilutable with a fatty acid methyl ester. Preferred volatile organic compounds include but are not limited to petroleum distillates such as naphtha, mineral spirits, mineral oil and Stoddard solvent, aliphatic hydrocarbons such as pentanes, hexanes, heptanes, octanes, nonanes, decanes, and the like, ketones such as acetone, butyryl lactone, caprolactum and the like, and aromatic hydrocarbons such as toluene, xylenes, benzene and the like, glycol ethers such as propylene glycol monomethyl ether, ethylene glycol monoethyl ether, ethylene glycol monobutyl ether, propylene glycol monobutyl ether, ethylene glycol monopropyl ether, and the like, including derivatives of the above.

With respect to the methods for cleaning an ink bearing part of a printing press, in one embodiment, the method is directed to cleaning the rubber blanket of a printing press. A cloth or rag saturated with a cleaner composition of the invention may be used to wipe the ink from the rubber blanket. The cleaner/ink mixture has reduced adherence for, and is readily removed from, the rubber blanket and absorbed into the cloth material. Excess cleaner is removed, leaving a film of cleaner wetting the rubber blanket, and printing may then be resumed. Also, advantageously, the cleaner compositions of the invention may be used with automatic blanket washers which are known in the art, where previously the use of volatile organic compounds was required. Further, since the cleaner compositions of the invention are miscible with ink compositions without destroying the tack of the ink, such cleaner compositions may be sprayed onto the roller train while the press is in operation. The mechanical action of the press (e.g., the contact which effects transfer of ink from the roller train to the image plate to the rubber blanket, etc.) results in the cleaner compositions being combined with the image being transferred downstream and printed on paper substrate. Print quality (e.g., resolution, color matching, etc,) returns to commercially acceptable standards within a few print cycles. The time savings resulting from not needing to stop the press adequately compensates for the slight loss of printed product.

In another embodiment, the method is directed to cleaning the roller train of a printing press. In this embodiment, the cleaner compositions, which comprise a fatty acid methyl ester and an ethoxylated $C_4$–$C_{10}$ alcohol (for conventional inks) or a fatty acid methyl ester and a heteric alkylene oxide of a $C_1$–$C_4$ alcohol (for UV inks), preferably further comprise a heteric alkylene oxide condensation product (ethylene oxide and propylene oxide) of a $C_{12}$–$C_{18}$ linear or branched chain alcohol, and preferably also water. Such compositions have been found to provide improved the deep cleaning ability of the cleaner compositions. With a clean-up blade in place, as known in the art, the cleaner compositions are sprayed or squirted onto the roller train while the press is at idle speed to easily remove the ink/cleaner mixture. The cleaner/ink mixture may be water-rinsed from the rollers.

The following Examples are presented by way of illustration and are not intended to limit the scope of the present invention in any manner.

EXAMPLE 1

This Example demonstrates the affect that the cleaning compositions of the invention and various prior art compositions have on the tack of ink, as measured by the resistance of the ink to being drawn across a nonporous rubber mat. The rubber mat was cleaned before each test with the same cleaning composition used to dilute the ink. The blanket was wiped to remove excess cleaner, but a film of cleaner was left on the surface of the rubber blanket. A 9:1 mixture of ink to cleaner composition (vol:vol) was made and a 5 ml bead of the mixture was applied to the rubber blanket. Then the bead of ink was drawn across the rubber blanket using a putty knife. The blade of the knife was maintained at about a 30° angle to the horizontal and the downward force on the knife was kept essentially constant by placing a 0.5 Kg weight on the knife blade. The "draw distance" of the diluted ink composition was measured. Shorter draw distances correspond to higher tack values. As shown below, ink diluted with cleaning composition comprising methyl soyate and mineral spirits or methyl soyate and hexyl ethoxylate retained the highest tack values (i.e., exhibited the shortest draw distances) of the compositions tested.

TABLE 1

| Cleaning Composition | | Length of Draw |
|---|---|---|
| Mineral Spirits | | 4.5" |
| HDP Vegetable Oil Wash (Hydro-Dynamic Products, Ltd. West Sussex, England) | PRIOR ART COMP. (Non-volatile) | 6.25" |
| Methyl Soyate* | | 2.75" |
| Soybean Oil | | 6.5" |
| Methyl Soyate: Mineral Spirits (3:1) | | 2.75" |
| 50% Methyl Soyate,* 20% Hexyl Ethoxylate,** 20% Plurafac D-25, 10% water | | 1.5" |
| 56% Methyl soyate*, 22% Hexyl Ethoxylate,** 22% Plurafac D-25 | | 1.5" |
| 90% Methyl Soyate*, 10% Heptane | | 2.75" |
| 80% Methyl Soyate*, 10% Heptane, 10% Hexyl Ethoxylate** | | 2.25" |

*OLEOCAL ME-130, Calgene Chemical, Skokie, Illinois
**4.5 moles ethylene oxide:1 mole hexanol

EXAMPLE 2

This Example demonstrates the ability of the compositions of the present invention to allow the cleaning of an ink-laden rubber blanket and the resumption of the printing operation while the rubber blanket is still wetted with the cleaner.

A six station Heidelberg Speedmaster 40" Sheetfed press was set-up using standard PMS Soybean based inks (Midwest Ink Co., Melrose Park, Ill.), coated paper stock and FUJI FND negative plates. The press was run until a series of commercially acceptable prints was obtained. Then the apparatus was stopped and the ink-bearing rubber blanket was cleaned with a lint-free cloth saturated with a cleaning composition of Table 2 below. While the rubber blanket was still wetted with a film of the cleaning composition, the printing operation was resumed. The printing job was a 4-color job, requiring color-matching, and the image area contained both screening and dots. The number of sheets printed until a commercially acceptable print was obtained is reported in Table 2 below.

TABLE 2
RUBBER BLANKET WASH

| Composition | | Number of Unacceptable Prints Before a Commercially Acceptable Print is Obtained |
|---|---|---|
| 50% Methyl Soyate,*<br>20% Hexyl Ethoxylate,**<br>20% Plurafac D-25,<br>10% water | | 6 |
| Same as above except with<br>Mazawet DF for<br>Plurafac D-25 | | 9 |
| Same as above except with<br>Plurafac B-25-2 for<br>Plurafac D-25 | | 8 |
| Same as above except with<br>Macol 25 for<br>Plurafac D-25 | | 6 |
| Same as above except with<br>Triton CF-76 for<br>Plurafac D-25 | | 14 |
| Same as above except with<br>Alkasurf LA-EP35 | | 9 |
| Mineral Spirits | | 26 |
| Soybean Oil | | 43 |
| HDP Vegetable Oil Wash<br>(Hydro-Dynamic<br>Products, Ltd.<br>West Sussex, England) | PRIOR<br>ART<br>COMPO-<br>SITION<br>(Non-<br>volatile) | 96 |
| Methyl Soyate* | | 22 |
| Methyl Soyate*,<br>Mineral Spirits (3:1) | | 18 |
| 56% Methyl Soyate*,<br>22% Hexyl Ethoxylate,**<br>22% Plurafac D-25 | | 12 |
| 90% Methyl Soyate,*<br>10% Heptane | | 18 |
| 80% Methyl Soyate,*<br>10% Heptane<br>10% Hexyl Ethoxylate,** | | 14 |
| 90% Methyl Soyate,*<br>10% Acetone | | 19 |
| 90% Canola Methyl Esters,<br>10% Acetone | | 19 |
| 85% Methyl Soyate,*<br>15% Hexyl Ethoxylate,** | | 15 |
| 90% Methyl Soyate,*,<br>10% VM&P Naphtha | | 23 |

*OLEOCAL ME-130, Calgene Chemical, Skokie, Illinois
**4.5 moles ethylene oxide:1 mole hexanol

EXAMPLE 3

This example demonstrates the capacity of the ink cleaning compositions of the invention to solubilize ink compositions without allowing the ink composition (i.e., pigment, carrier, emulsifier) to separate. Separation of the ink is one factor which increases the difficulty of cleaning ink compositions from the rubber blanket and other components of a printing press.

100 ml of ink composition (30% soy ink O/S modified magenta) was blended mixed with various amounts of cleaner compositions and constituents thereof using a high-speed turbo prop agitator. The mixture was then observed every 30 minutes for up to 4 hours to determine whether the ink pigments separated. Cleaning compositions of the invention comprising methyl soyate and mineral spirits or methyl soyate and a nonionic surfactant which is a hexyl ethoxylate were able to be mixed with the ink compositions in significantly greater amounts without separation of the ink pigment.

TABLE 3

| Cleaning Composition | | Max. % of Cleaning Composition Before Pigment Separates |
|---|---|---|
| Mineral Spirits | | 35% |
| HDP Vegetable Oil Wash | PRIOR ART COMP.<br>(Non-volatile) | 33% |
| Soybean Oil | | 33% |
| Methyl Soyate* | | 90+% |
| Methyl Soyate,*<br>Mineral Spirits (3:1) | | 70% |
| 50% Methyl Soyate,*<br>20% Hexyl Ethoxylate,**<br>20% Plurafac D-25<br>10% water | | 90% |
| 56% Methyl Soyate,*<br>22% Hexyl Ethoxylate,**<br>22% Plurafac D-25 | | 90+% |
| 85% Methyl Soyate,*<br>5% Hexyl Ethoxylate,** | | 90+% |
| 90% Methyl Soyate,*<br>10% Heptane | | 70% |
| 80% Methyl Soyate,*<br>10% Heptane<br>10% Hexyl Ethoxylate,** | | 90+% |

*OLEOCAL ME-130, Calgene Chemical, Skokie, Illinois
**4.5 moles ehtylene oxide:1 mole hexanol

EXAMPLE 4

This Example demonstrates ability of various cleaning compositions to lower the adherence of an ink composition to parts of a printing apparatus and concurrently provide an ink/ink cleaner mixture which is readily absorbed into a cloth used to clean the printing apparatus. Reduced adhesion permits the ink compositions to be smeared across a surface and good absorbability and wettability permits absorbance of the ink/cleaner into a suitable cloth material. Both qualities should be simultaneously present.

To test for reduced adhesion of the ink/cleaner mixture, a 10 ml aliquot of a 1:1 mixture (by volume) of the ink and each of the respective cleaner compositions was applied to a nonporous rubber blanket and wiped with a dry cleaning rag. The relative length of the smear was observed and scored as follows: 1=very short smear-high adhesion properties; 3=moderate smear-medium adhesion properties; 5=very long smear-low adhesion properties. A score of 2 or 4 indicates an intermediate result.

In a separate test for absorbability of the ink/cleaner mixtures into an absorbent material, a 5 ml aliquot 1:1 mixture of ink and each of the compositions listed in Table 4 was applied to a 5-layer thickness of paper toweling and the absorbability and wickability characteristics of the mixture observed. Absorbability was scored based on the number of layers of paper toweling through which the mixture penetrated (1 layer to 5 layers). Wickability was measured by the diameter of the ink spot from the absorbed ink/cleaner mixture.

An ink/cleaner mixture desirably should have both reduced adhesion with respect to the surfaces of the printing press, as well as good absorbability and wickability characteristics to facilitate penetration of the ink/cleaner mixture into the absorbent cloth, as ink is loosened from the part.

TABLE 4

| Composition | | Reduction of Adhesion | Absorbability/ Wickability |
|---|---|---|---|
| Mineral Spirits | | 5 | 5 |
| HDP Vegetable Oil Wash Hydro-Dynamic Products, Ltd. West Sussex, England) | PRIOR ART COMPOSITION (Non-volatile) | 2 | 2 |
| Methyl Soyate* | | 5 | 4 |
| Soybean Oil | | 2 | 2 |
| Methyl Soyate,* Mineral Spirits (1:3) | | 5 | 5 |
| 50% Methyl Soyate,* 20% Hexyl Ethoxylate,** 20% Plurafac D-25, 10% water | | 4 | 4 |
| 56% Methyl Soyate,* 22% Hexyl Ethoxylate,** 22% Plurafac D-25 | | 4 | 4 |
| 90% Methyl Soyate,* 10% Heptane | | 5 | 5 |
| 80% Methyl Soyate,* 10% Heptane 10% Hexyl Ethoxylate,** | | 5 | 5 |

Adhesion
1 = very short smear-high adhesion
2 = low-medium
3 = medium
4 = medium-high
5 = very long smear-low adhesion
Absorbability/Wickability
1 = low
2 = low-medium
3 = medium
4 = medium-high
5 = high
*OLEOCAL ME-130, Calgene Chemical, Skokie, Illinois
** 4.5 moles ethylene oxide:1 mole hexanol While the invention has been described with some specificity, modifications apparent to those with ordinary skill in the art may be made without departing from the spirit of the invention.

Various features of the invention are set forth in the following claims.

What is claimed is:

1. A liquid ink cleaner composition for removing ink from parts of a printing press, said composition comprising:
   60%–95% by weight of a methyl ester of a $C_8$–$C_{22}$ fatty acid; and
   5%–40% by weight of a nonionic surfactant which is an ethoxylated $C_4$–$C_{10}$ alcohol having a molar ratio of ethylene oxide to alcohol of between about 2:1 to about 8:1;
   wherein the ink cleaner is miscible with a printing ink composition at dilutions up to at least 2:1 by volume (ink:cleaner) without significantly reducing the tack of the ink.

2. An ink cleaner composition according to claim 1 wherein the fatty acid methyl ester is a methyl ester of a vegetable oil.

3. An ink cleaner composition according to claim 1 wherein the methyl ester is selected from the group of soybean oil methyl ester and canola oil methyl ester.

4. An ink cleaner composition according to claim 1 wherein the surfactant is an ethoxylated hexanol.

5. An ink cleaner composition according to claim 4 wherein the ethoxylated hexanol has between about 4 moles and about 5 moles ethylene oxide per mole of hexanol.

6. An ink cleaner composition according to claim 5 which comprises about 85% soybean oil methyl ester and about 15% ethoxylated hexanol.

7. A liquid ink cleaner composition for removing ink from parts of a printing press, said composition comprising:
   40%–90% by weight of a methyl ester of a fatty acid; and
   5%–30% by weight of a first nonionic surfactant which is an ethoxylated $C_4$–$C_{10}$ alcohol having a molar ratio of ethylene oxide to alcohol of between about 2:1 to about 8:1;
   5%–30% by weight of a second nonionic surfactant which is a heteric alkylene oxide condensation product of $C_{12}$–$C_{18}$ alcohol wherein the condensation product is formed from alkylene oxide containing both ethylene oxide and propylene oxide; and
   0–20% water;
   wherein the ink cleaner is miscible with a printing ink composition at dilutions up to at least 2:1 by volume (ink:cleaner) without significantly reducing the tack of the ink.

8. An ink cleaner composition according to claim 7 wherein the fatty acid methyl ester is a methyl ester of a vegetable oil.

9. An ink cleaner composition according to claim 7 wherein the methyl ester is selected from the group of soybean oil methyl ester and canola oil methyl ester.

10. An ink cleaner composition according to claim 7 which comprises about 50%–60% soybean oil methyl ester, about 20%–25% of said ethoxylated hexanol, and about 20%–25% of said heteric alkylene oxide of a $C_{12}$–$C_{18}$ alcohol.

11. An ink cleaner composition according to claim 7 which comprises about 5%–10% water by weight.

12. An ink cleaner composition according to claim 11 wherein the first surfactant is an ethoxylated hexanol.

13. An ink cleaner composition according to claim 12 wherein the ethoxylated hexanol has between about 4 moles and 5 moles of ethylene oxide per mole of hexanol.

14. An ink cleaner composition comprising about 50% soybean oil methyl ester, about 20% of said ethoxylated hexanol, and about 20% of said heteric alkylene oxide of a $C_{12}$–$C_{18}$ alcohol and about 10% water.

15. An ink cleaner composition according to claim 14 wherein said heteric alkylene oxide has a ratio of ethylene oxide:propylene oxide which is greater than 1 near the alcohol portion of the molecule and less than 1 near the hydrophilic end of the molecule.

16. A liquid ink cleaner composition for removing a photoreactively curable ink from parts of a printing press, wherein the photoreactively curable ink can be cured by exposure to ultraviolet radiation, said composition comprising:
   50%–95% by weight of a methyl ester of a $C_8$–$C_{22}$ fatty acid; and
   5%–50% by weight of a heteric alkylene oxide condensation product of a $C_1$–$C_4$ alcohol having about 70% to about 98% alkylene oxide by weight, wherein said alkylene oxide portion comprises ethylene oxide and propylene oxide in a ratio of from about 1:2 to about 1:1.

17. A liquid ink cleaner according to claim 16 wherein said $C_1$–$C_4$ alcohol is methanol and said heteric alkylene oxide has 3.5 moles of ethylene oxide and 5.5 moles propylene oxide per mole of methanol.

18. A liquid ink cleaner composition according to claim 16 wherein said fatty acid methyl ester is methyl ester of a vegetable oil.

19. A liquid ink cleaner composition for removing ink from parts of a printing press, said composition comprising:
50%–95% by weight of a methyl ester of a fatty acid; and
5% to 50% by weight of a solvent which is a volatile organic solvent.

20. A liquid ink cleaner composition according to claim 19 wherein the solvent includes an aliphatic or aromatic hydrocarbon.

21. A liquid ink cleaner composition according to claim 19 comprising soybean oil methyl ester and mineral spirits in a ratio of about 3:1, by volume.

22. A liquid ink cleaner composition according to claim 19 wherein the volatile organic compound is a glycol ether.

23. A method for cleaning a rubber blanket of a printing press, the rubber blanket having a transferring surface having an image comprising ink and aqueous fountain solution, which image is transferred from an image plate to the transferring surface of the rubber blanket and then from the transferring surface of the rubber blanket to paper in the process of printing, the method comprising:
(a) contacting the image comprising ink and aqueous fountain solution with a sufficient quantity of an ink cleaner composition for a sufficient amount of time to substantially remove the ink image from the transferring surface of the rubber blanket, said ink cleaner composition being combinable with the ink and fountain solution without substantially affecting the transferability of the ink image; and
(b) while the rubber blanket is wetted with the cleaner composition, operating the printing press to transfer a series of images comprising ink and aqueous fountain solution to the rubber blanket from the image plate and in turn to a plurality of sheets of paper whereby, with each cycle of the printing operation, the ink cleaning composition is diluted by the ink and aqueous fountain solution and transferred to said sheets of paper to yield prints having incrementally increasing resolution until a plurality of prints of acceptable resolution are produced;
wherein the ink cleaner composition comprises:
60%–95% by weight of a methyl ester of a $C_8$–$C_{22}$ fatty acid;
5%–40% by weight of a first nonionic surfactant which is an ethoxylated $C_4$–$C_{10}$ alcohol having a molar ratio of ethylene oxide to alcohol of between about 2:1 to about 8:1;
0–30% by weight of a second nonionic surfactant which is a heteric alkylene oxide condensation product of $C_{12}$–$C_{18}$ alcohol wherein the condensation product is formed from alkylene oxide containing both ethylene oxide and propylene oxide; and
0–20% water.

24. A method according to claim 23, wherein step (a) is performed by an automatic blanket washer.

* * * * *